June 23, 1959

M. G. STARKS 2,891,800

TOOL TRAILER

Filed Feb. 7, 1955

Milton G. Starks
INVENTOR.

BY *Thomas A O'Brien*
*and Harvey B. Jacobson*
Attorneys

June 23, 1959 M. G. STARKS 2,891,800
TOOL TRAILER
Filed Feb. 7, 1955 2 Sheets-Sheet 2
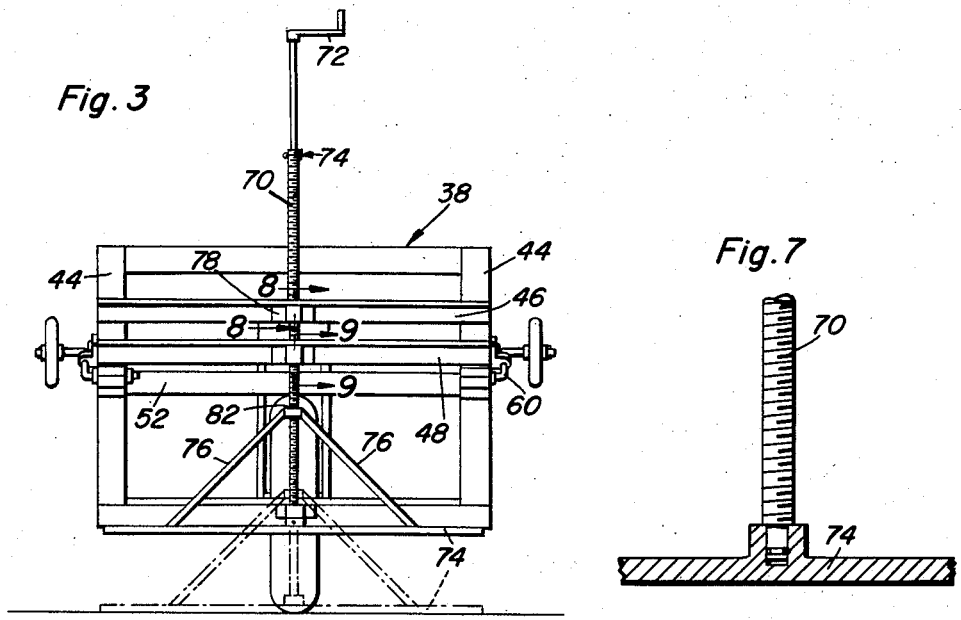
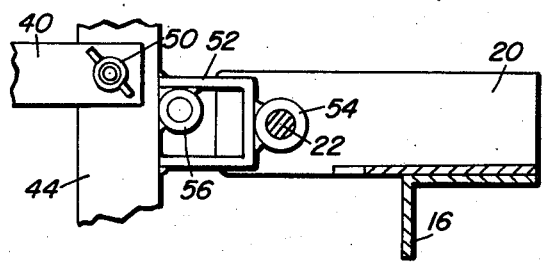
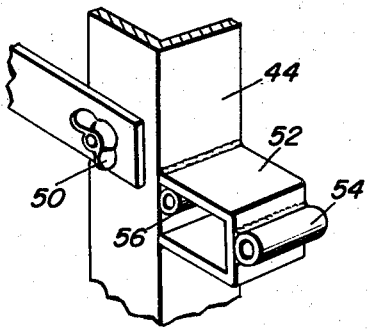
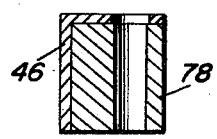
Milton G. Starks
INVENTOR.

United States Patent Office 2,891,800
Patented June 23, 1959

2,891,800

TOOL TRAILER

Milton G. Starks, Elgin, Ill.

Application February 7, 1955, Serial No. 486,489

3 Claims. (Cl. 280—2)

This invention comprises novel and useful improvements in a tool trailer and more specifically pertains to a trailer for automotive vehicles which is particularly adapted for transporting tool cabinets or other equipment of mechanics, plumbers, and other skilled workers in a convenient and satisfactory manner.

The primary object of this invention is to provide a trailer especially adapted for coupling to the rear bumpers of automotive vehicles and which small be especially adapted for storing and transporting tool cabinets or other equipment of mechanics.

A further object of the invention is to provide a trailer which may be quickly detachably secured to the rear bumper of an automotive vehicle in such a manner as to provide the necessary vertical pivoting movement of the trailer with respect to the vehicle to facilitate the transportation of the trailer over highways and the like.

A further object of the invention is to provide an improved trailer in conformity with the foregoing objects in which a front wheel assembly shall be so mounted as to be capable of easy pivoting movement into a load carrying position and into a raised non-load supporting position.

Yet another object of the invention is to provide an adjustable support whereby the trailer when uncoupled from the vehicle may be supported in a normally horizontal position upon the ground and in a stationary manner; and yet which support may be retracted to permit the lowering of the load supporting wheels.

A still further specific object of the invention is to provide a trailer construction wherein the means for connecting the trailer to a bumper of a vehicle shall also support in an improved manner pivotally mounted front wheels.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a front elevational view of the trailer of Figure 1, the stationary supporting means being shown in full lines in its raised position and in dotted lines in its lowered position, while the front wheels are shown in their raised, non-load supporting position;

Figure 5 is a fragmentary detailed view taken upon an enlarged scale and showing part in elevation and part in vertical section certain details of the coupling or connecting means for securing the trailer to a support which is carried by the bumper of a vehicle;

Figure 6 is a further detailed view in perspective showing the construction of the trailer frame whereby a hinge connection is provided for securing the trailer to the support carried by the bumper of a vehicle and for journalling the vertical pivoting front wheel mountings;

Figure 7 is a fragmentary detailed view taken upon an enlarged scale in vertical section of the lower portion of the adjusting rod and of the supporting member carried thereby;

Figure 9:
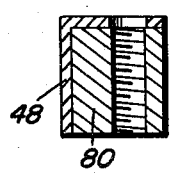

Figure 8 is a vertical transverse sectional view taken substantially upon the plane indicated by the section line 8—8 of Figure 3 and showing the construction of one of the guide bushings for the adjusting rod; and Figure 9 is a vertical sectional view taken substantially upon the plane indicated by section line 9—9 of Figure 3 and showing the construction of an internally threaded bushing whereby the adjusting rod may be manipulated to raise and lower the stationary foot member of the trailer.

In the accompanying drawings a trailer indicated generally by the numeral 10 is shown as being detachably connected to the rear portion of a vehicle such as an automobile or the like 12, as by being attached to the rear bumper 14 thereof. In order to adapt the trailer and bumper for detachable connection with each other there is provided a support which comprises a transversely disposed angle iron beam or the like 16 provided with conventional clamps 18 whereby the same may be attached to the rear bumper 14. Welded or otherwise secured to the top surface of the angle iron member 16 are a pair of rearwardly extending channel members 20, shown best in Figures 2 and 5. The rear ends of the side walls of these channel members are apertured to receive hinge pins or pivot members 22 by means of which the trailer may be detachably connected to the support.

Figure 2:
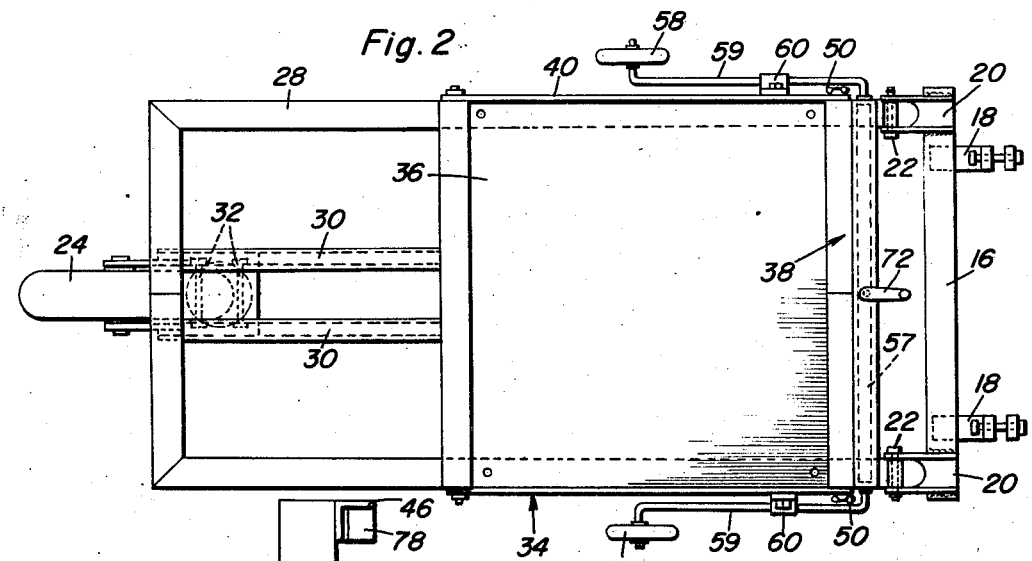
Figure 2 is a top plan view of the arrangement of Figure 1, the trailer and its connecting means being shown disassociated from the rear bumper of an automobile.
Figure 4:
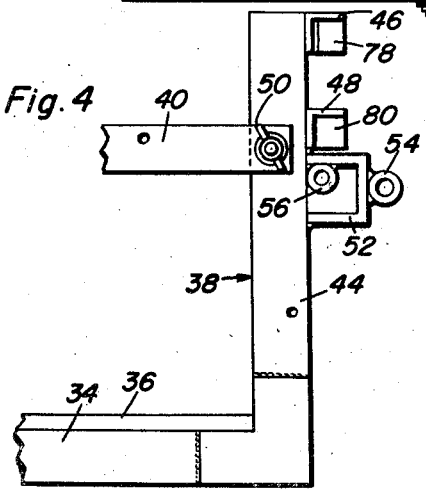
Figure 4 is an enlarged side elevational detail view of a portion of the front end of the frame of the trailer.

The trailer itself consists of a frame which is preferably composed of conventional steel structural elements such as angle iron members and the like. This frame at its rear end is provided with a caster wheel 24 which is swivelly mounted as by a bearing assembly 26 to the rearwardly extending portion 28 of the trailer frame. Conveniently, as shown in Figure 2, this rearwardly extending portion may include a pair of parallel angle iron members 30 disposed centrally of the portion 28 and to which the journal assembly which may be of any conventional design is secured as by bolts 32.

The main portion 34 of the frame of the trailer is preferably provided with a floor panel 36 and is depressed below the horizontal level of the rearwardly extending portion 28, to provide a space for the placing of tool cabinets or any other desired equipment of the mechanic. At its front end, the trailer frame has a vertically extending component 38 and horizontal brace rods or bars 40 are connected to the front portion 38, and a vertical wall portion 42 which connects the main portion 34 with the rearwardly extending portion 28 as will be apparent from Figure 1.

Referring now particularly to Figure 3 it will be seen that the front portion 38 includes a pair of vertically disposed angle iron members 44 which define the front corner posts of the front portion, suitable transversely disposed reinforcing or brace angle iron members 46 and 48 being welded or otherwise attached thereto. It will be noted that the previously mentioned side braces 40 may be secured as by wing nuts 50 to the front corner post members 44.

A connecting means is provided by means of which the trailer may be connected to the support means carried by the bumper of the vehicle. For that purpose there is provided the horizontally disposed transverse channel member 52 secured between the forward post 44. Welded to this channel member are a pair of bushings 54 which are adapted to be received in the bifurcated brackets 20 for pivotal attachment thereto by the previously mentioned hinge or pivot pins 22. Thus, the trailer assembly may be pivotally secured to the support member. Likewise welded to the forward post 44 are a pair of bushings 56 which may be disposed within the channel members 52 as shown in Figure 5 and which constitute journals as set forth hereinafter.

Figure 1:
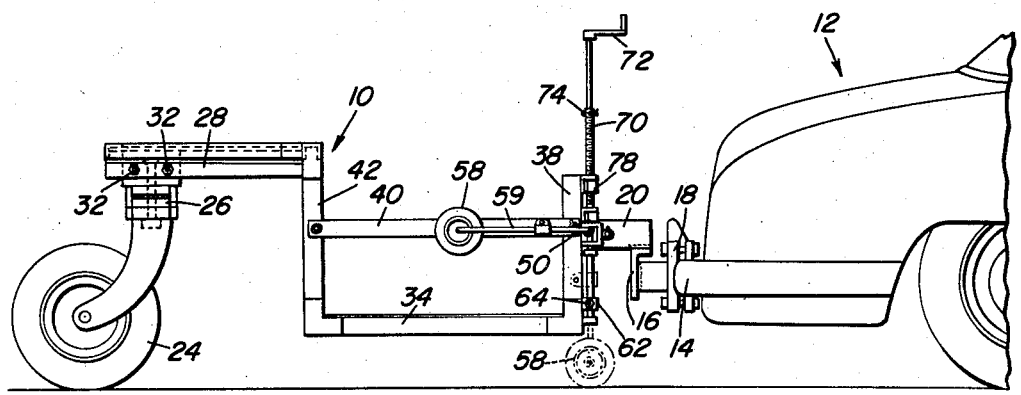
Figure 1 is a side elevational view of the rear portion of an automobile showing the manner in which a preferred embodiment of trailer in accordance with this invention is coupled thereto for transportation thereby, the front supporting wheels of the trailer being shown in full lines in their raised non-load supporting position and in dotted lines in their lowered load supporting position.

The forward end of the trailer is provided with a pair of pivotally mounted front wheels which may be selectively raised or lowered between an idle position and a load supporting position as shown in full lines and dotted lines in Figure 1. For that purpose, there is provided a crank axle assembly consisting of a transverse axle indicated in dotted lines at 57 in Figure 2 and which is oscillatively received in the bushings or journals 56. The opposite ends of the axle 57 provided with crank arms 59 which at their outer extremities provide journals for the front supporting wheels 58. It will thus be seen that the front wheels 58 may pivot in the journal bearing 56.

Secured to the sides of the frame are a pair of supporting clamps 60 which are positioned to support the crank arms 59 and thus support the forward wheels in the raised position of the latter as will be apparent from Figures 1 and 2. When, however, the wheels are pivoted into their lowered position, as by moving the same in a clockwise direction from the full line to the dotted line position shown in Figure 1, the wheels will be disposed below the frame of the trailer and in position for supporting the same. Locking means are provided for securing the wheels in their lowered, load supporting position. For this purpose clamp means 62 are secured to opposite sides of the frame adjacent its lower portion, these clamps being adapted to receive the arms 59 therein. By means of fastening bolts 64 which extend through apertures in the clamps and in the arms, the crank arms and the front wheels may be retained in lowered position. The same bolts 64 may be selectively used with the clamps 60 or 62 to secure the wheels in their raised or lowered positions.

A further supporting means is provided whereby the front end of the trailer may be supported in horizontal position upon the ground or other surface in a stationary manner. For this purpose, there is provided a substantially vertically arranged adjusting rod 70 which at its upper end may be provided with a crank handle 72 which is removably coupled thereto as by a cotter pin 74, this rod being screw-threaded throughout its length and being swively connected at its lower end to a foot member 74 having suitable braces 76. This rod extends through vertically disposed guide bushings 78 one of which is shown secured to the upper transverse frame member 46, as by welding or the like. The rod is also screw-threadedly engaged in an internally threaded bushing 80 which is secured to the frame member 48. As will be best apparent from Figure 3, the brace rods 76 terminate in a collar 82 having a non-threaded bore which is loosely received on the rod.

By this arrangement the rod is retained in vertical position, and by rotating the rod the same may be caused to raise or lower the supporting foot 74 from an inoperative position shown in full lines in Figure 3 to a lowered, operative position shown in dotted lines therein. Thus, the trailer may be secured and supported in a stationary manner when uncoupled from the rear bumper of a vehicle.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A trailer comprising a frame having a relatively low flat and depressed platform between its forward and rear ends adapted to support a tool cabinet thereon, rear supporting means located rearwardly of said platform and extending above the same for supporting the rear end of said frame from the ground, front supporting means disposed forwardly of said platform for supporting the front end of said frame from the ground, means disposed forwardly and above said platform for coupling the front end of said frame to the rear end of a towing vehicle, the front supporting means comprising crank axles pivoted on said frame forwardly of and above said platform and extending laterally beyond the sides of said frame, wheels journaled on said axles, brackets on the sides of said frame and disposed above the platform for supporting said crank axles in a lifted position with their wheels elevated above said platform, locking means securing the wheels in lowered and operative position, said locking means comprising bifurcated brackets secured to said frame forwardly of and above said platform and each receiving an arm of said crank axle when the latter is in lowered and operative position, a fastener releasably securing an arm of said crank axle in the furcations of each bracket.

2. A trailer for carrying tools comprising a frame having a flat vertically depressed platform between its forward and rear ends for supporting a tool cabinet thereon, said frame including a flat, horizontal portion positioned above and extending rearwardly from the rearward end of said platform, a support wheel disposed medially of and beneath said portion and projecting rearwardly thereof, means swively mounting said wheel upon said portion, front supporting means connected to and projecting forwardly of said frame and disposed above said platform but below said portion for coupling the front end of said frame to the rear end of a towing vehicle, a shaft having crank arms at the ends thereof with an outturned stub axle on the end of each crank arm, a support wheel journaled on each stub axle, means journaling said shaft upon the forward end of said frame, said shaft, crank arms and support wheels being so disposed that upon rotation of the shaft in said journaling means the support wheels and their crank arms may be lowered to position the wheels below the frame for supporting the front end of the latter and may be lifted to position the crank arms and support wheels in elevated position against the sides of said frame, brackets on the sides of said frame supporting the crank arms in their elevated position, locking means on said frame disposed forwardly of and above said platform and locking said crank arms in their lowered position.

3. The combination of claim 2 wherein said shaft journaling means is mounted upon said front supporting means.

References Cited in the file of this patent

UNITED STATES PATENTS

| | | |
|---|---|---|
| 619,646 | Ward | Feb. 14, 1899 |
| 863,585 | Bowman | Aug. 20, 1907 |
| 1,124,019 | Hareland | Jan. 5, 1915 |

(Other references on following page)

UNITED STATES PATENTS

| | | |
|---|---|---|
| 1,415,008 | Barber | May 9, 1922 |
| 1,667,267 | Pitcher | Apr. 24, 1928 |
| 1,693,633 | Allen | Dec. 4, 1928 |
| 2,113,448 | Hewitt | Apr. 5, 1938 |
| 2,127,359 | Harley | Aug. 16, 1938 |
| 2,216,584 | Boden | Oct. 1, 1940 |
| 2,245,935 | Neighbour et al. | June 17, 1941 |

FOREIGN PATENTS

| | | |
|---|---|---|
| 883,838 | Germany | July 20, 1953 |
| 259,155 | Great Britain | Oct. 7, 1926 |